US010828838B2

(12) United States Patent
Moorlag et al.

(10) Patent No.: US 10,828,838 B2
(45) Date of Patent: Nov. 10, 2020

(54) 3D PRINTING SUPPORT STRUCTURES INCORPORATING SACRIFICIAL MATERIALS

(71) Applicant: Xerox Corporation, Norwalk, CT (US)

(72) Inventors: Carolyn P. Moorlag, Mississauga (CA); Nan-Xing Hu, Oakville (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 7 days.

(21) Appl. No.: 16/123,625

(22) Filed: Sep. 6, 2018

(65) Prior Publication Data

US 2020/0079026 A1 Mar. 12, 2020

(51) Int. Cl.
*B29C 64/40* (2017.01)
*B29K 69/00* (2006.01)
*B33Y 40/00* (2020.01)
*B33Y 70/00* (2020.01)

(52) U.S. Cl.
CPC .......... *B29C 64/40* (2017.08); *B29K 2069/00* (2013.01); *B33Y 40/00* (2014.12); *B33Y 70/00* (2014.12)

(58) Field of Classification Search
CPC ......... B29C 64/40; B33Y 40/00; B33Y 70/00; B29K 2069/00
See application file for complete search history.

(56) References Cited

U.S. PATENT DOCUMENTS

| 4,814,370 A * | 3/1989 | Kramer | ................. C04B 35/634 524/391 |
| 4,882,110 A * | 11/1989 | Kramer | ................. C04B 35/634 264/670 |
| 2016/0185050 A1* | 6/2016 | Topolkaraev | ........... B29C 64/20 264/308 |
| 2017/0148539 A1* | 5/2017 | Prestayko | ............. B29C 64/165 |
| 2017/0327701 A1* | 11/2017 | Connor | ................. B33Y 10/00 |

OTHER PUBLICATIONS

QPAC 40 Technical Data Sheet, Empower Materials, undated, accessed on Nov. 7, 2019, http://empowermaterials.com/wp-content/uploads/2014/11/QPAC-40-Technical-Data-Sheet.pdf.*

* cited by examiner

*Primary Examiner* — Nicholas E Hill
(74) *Attorney, Agent, or Firm* — Hoffman Warnick LLC

(57) ABSTRACT

The present teachings according to various embodiments provides a support material for 3D printing. The support material includes poly(alkylene carbonate) having a decomposition temperature of from 100 ° C. to about 300 ° C.

9 Claims, 3 Drawing Sheets

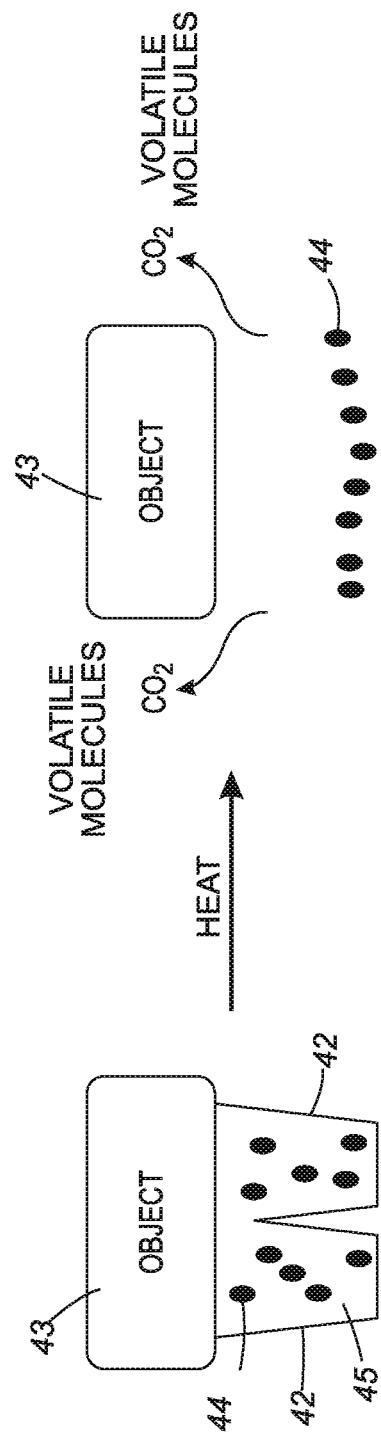

3D PRINTING SUPPORT STRUCTURES INCORPORATING SACRIFICIAL MATERIALS

BACKGROUND

Field of Use

This disclosure is generally directed additive manufacturing, including three dimensional (3D) manufacturing. This disclosure also relates to products made by additive manufacturing.

Background 3D printing, also known as additive manufacturing (AM), is a type of printing technology whereby physical objects are built-up in an "additive" process, most commonly by curing liquid resins, extruding molten plastic from heated nozzles, or sintering layers of polymeric or metallic powders.

Structural supports are required for most AM processes. For example, for fused deposition modeling (FDM) printing of polymeric parts, supports of the same or a different material are used and must be removed by cutting and sanding away the part, or melting or dissolving if the support material is meltable or dissolvable. Even in the cases of melting or dissolving, the process will involve an extra step of placing the object in a bath or scraping away melted wax, etc. Other AM techniques require a support material that is highly supportive, easily removable, and enables automation.

Traditional selective laser sintering (SLS) and metallic powder printing use a powder, with the powder bed generally being self-supporting. However, newer processes are emerging, making use of layer-by-layer powders, and these processes require supports that must be easily removed. Electrophotographic printing to make 3D objects has been demonstrated and utilizes 3D support powders to function.

Most 3D printing requires removable supports as part of the printing process and a significant disadvantage is that removal of supports is done manually, such as by bath dissolution, cutting, scraping, sanding, and/or polishing. A support material system enabling an automated support removal process is desirable.

SUMMARY

According to various embodiments, there is provided a support material for 3D printing. The support material includes poly(alkylene carbonate) having a decomposition temperature of from 100° C. to about 300° C.

Disclosed herein is a three-dimensionally article comprising a build material and a support material. The support material includes poly(alkylene carbonate) having a decomposition temperature of from 100° C. to about 300° C.

A further aspect described herein provides a method of printing a three-dimensional article. The method includes printing a build material and printing a support material. The support material includes poly(alkylene carbonate) and the support material supports the build material. The support material is heated to a temperature above the decomposition temperature of the support material. The support material decomposes leaving the printed build material.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIGS. 4(A) and 4(B) show schematically an embodiment for forming a 3D object using core/shell particles disclosed herein.

Figure 1:
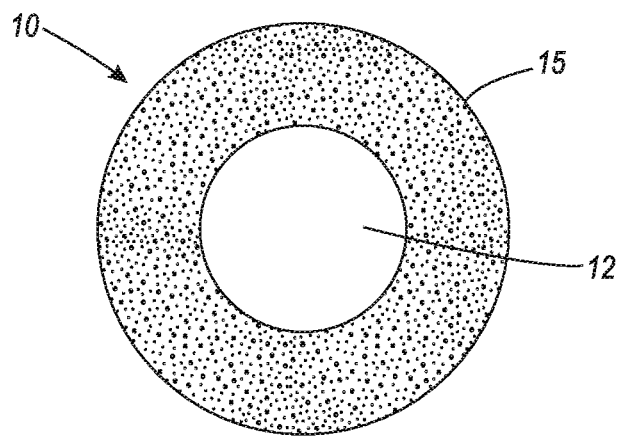
FIG. 1 is a schematic illustration of a core/shell particle according to various embodiments disclosed herein.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

3D printing refers to processes in which various materials are used to create three-dimensional (3D) objects. The materials are added together (such as liquid molecules or solid grains being fused together). 3D printing is used in both rapid prototyping and additive manufacturing (AM). 3D objects can be of almost any shape or geometry and typically are produced using digital model data from a 3D model or another electronic data source such as an Additive Manufacturing File (AMF) file (usually in sequential layers). Thus, unlike material removed from a stock in the conventional machining process, 3D printing or AM builds a three-dimensional object from computer-aided design (CAD) model or AMF file, usually by successively adding material layer by layer.

Fused deposition modeling (FDM) uses thermoplastic materials such as polylactic acid (PLA), acrylonitrile butadiene styrene (ABS), nylon, polyetherimide and acrylonitrile styrene acrylate (ASA). FDM 3D printing uses thermoplastic filaments that are unwound from a coil and supplied to an extrusion nozzle. The extrusion flow is turned on and off to deposit the thermoplastic material in the proper place. The nozzle is heated to melt the thermoplastic material. The thermoplastic material is soften by heating and deposited by a nozzle or extrusion head. The nozzle can be moved in both horizontal and vertical directions by a computer control. The nozzle follows a tool-path controlled by a computer-aided manufacturing (CAM) software package, and the part is built from the bottom up, one layer at a time.

MJM (Multijet Printing) is an inkjet printing process that uses piezo printhead technology to deposit photocurable plastics, layer by layer. Materials include UV curable materials such as acrylates and methacrylates.

Electrophotography-based additive manufacturing systems for printing 3D parts use an electrophotography (EP) engine to develop each layer of the 3D part out of a polymeric toner or powder-based material using the electrophotographic process. The developed layers are then transferred to a transfer medium, which delivers the layers to a transfusion assembly where the layers are transfused (e.g., using heat and/or pressure) to build a 3D part and support structures in a layer-by-layer manner. The powder material (e.g., polymeric or thermoplastic toner) used in electrophotographic 3D part printing processes is typically derived from one or more engineering-grade thermoplastic materials, such as acrylonitrile-butadiene-styrene (ABS).

Disclosed herein is a material composition for support material in 3D printing or other forms of AM. The support material incorporates a sacrificial material that is removed upon the application of heat above the decomposition temperature of the sacrificial material. Designs for composite inert/poly(alkylene carbonate) materials are provided, where inert components, such as silica/sand, titania and carbon, reduce the material costs, and increase the strength and stability of the support material or structural supports. The structural supports including an inert component(s) and poly(alkylene carbonate) that decomposes on the application of heat. Upon the application of heat, the poly(alkylene carbonate) decomposes leaving behind the inert component(s). The inert component(s) then fall away, and may be recaptured in and re-used.

Material compositions disclosed herein may be applied in various AM processes. For example, for FDM printing, melt-mixed polymer/filler material may be extruded to provide FDM supports. The disclosed material compositions may be used in metal injection molding (MIM). That is, the material compositions containing an inert material and poly(alkylene carbonate) can be injection molded to form a 3D object. The 3D object is sintered and the supports undergo decomposition for removal.

Inert materials such as silica/sand, titania, alumina, glass, metal, cellulose, synthetic polymers and carbon fibers, are incorporated into poly(alkylene carbonate) to produce the 3D printing support material. The incorporated inert materials in the composition add strength to the support material.

Poly(alkylene carbonate) is a copolymer derived from carbon dioxide and produced through the copolymerization of $CO_2$ with one or more epoxides. Various types of poly(alkylene carbonate) can be synthesized, including poly(ethylene carbonate), poly(propylene carbonate (PPC)), poly(butylene carbonate), poly(cyclohexene carbonate (PCC)), poly(norbornene carbonate), poly(cyclohexene propylene carbonate) and the like. The poly(alkylene carbonate) has a molecular weight (Mw) ranging from about 10,000 to about 500,000.

Poly(alkylene carbonates) are suitable thermally decomposable support materials owing to their favorable decomposition range and nearly residue-free decomposition in both inert and oxygen-rich environments. The decomposition of poly(alkylene carbonate) may occur in different paths depending the type of the polymer structures and surrounding chemical environments. For example, the thermal decomposition of PCC may occur via a random chain scission reaction, a chain unzipping reaction, or a combination of both. The random chain scission reaction as shown in Scheme 1 starts from breakage of an internal carbonate group, yielding carbon dioxide and oligomers. The resulting oligomers further decompose into volatile molecules such as carbon dioxide and acetone. On the other hand, the chain unzipping reaction starts from the ends of the polymer chain as illustrated in Scheme 2, resulting in propylene carbonate and an oligomer. Both the propylene carbonate and the oligomer may further decompose into volatile molecules, such as carbon dioxide, acetone, and propylene epoxide.

Scheme 1. Thermal decomposition of PCC via chain scission reaction

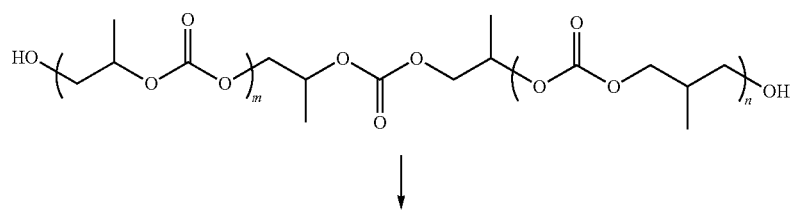

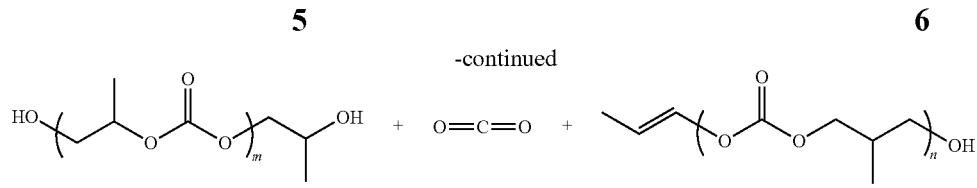

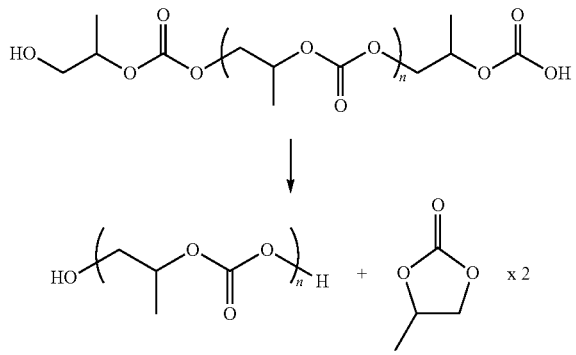

The support materials including poly(alkylene carbonate) have a tunable decomposition temperature ranging from about 100° C. to about 300° C., or from about 120° C. to about 250° C., or from about 150° C. to about 200° C. The decomposition temperature of the support materials can be determined by the molecular structure of the poly(alkylene carbonate). More conveniently, the poly(alkylene carbonate) can be tuned by adding a small quantity of an additive, which either serves as a stabilizer to increase the decomposition temperature, or as catalyst to decrease the decomposition temperature of the polymer.

In certain embodiments, some organic additives may be used as a stabilizer to suppress the polymer decomposition path induced by the chain scission (Scheme 1) by creating hydrogen bonding interactions between the carbonyl moieties of the backbone. Illustrative examples of such organic additives include cyclodextrins, carboxylic acids such as stearic acid, citric acid, and the likes. Alternatively, since the unzipping reaction (Scheme 2) may proceed by the attack of an electrophilic carbon atom in the polymer backbone by the hydroxyl end-group (—OH), end-capping of the reactive hydroxyl group via esterification with a reactive moiety, for example, maleic anhydride and the like, may raise the thermal decomposition temperature. The concentration of the organic additive can be from about 0.05 to about 10 weight percent, or from about 0.1 to about 8 weight percent, or from about 0.2 to about 5 weight percent of the poly (alkylene carbonate).

In other embodiments, the thermal decomposition of poly(alkylene carbonates) can be catalyzed by an acid or base, so as to occur more easily at a temperature below that of the pure polymer. From a practical standpoint, use of an acid catalyst or a base catalyst that can be generated by external stimuli, such as UV light or heat, and can allow processing of the polymer without degradation. This catalyst can be activated later by exposure to light or heat to facilitate the decomposition process for removal of the support materials. Various types of known photo and thermal acid generators may be incorporated into the support materials, including diphenyliodonium salts, benzyl sulfonate esters, imino sulfonate esters, and a spiropyran-based sulfonic acids. Illustrative examples of photo acid catalysts include 4-methylphenyl[4-(1-methylethyl)phenyl] tetrakis(pentafluorophenyl) borate or (4-tert-butylphenyl)iodonium tris (perfluoromethyl sulfonyl) methide, and the like. Illustrative examples of the photo base catalysts include 2-(9-oxoxanthen-2-yl)propionic Acid 1,5,7-Triazabicyclo[4.4.0]dec-5-ene salt or 1,5,7 e triaza-bicyclo [4.4.0]dec-5-ene tetraphenylborate. In embodiments, the concentration of the acid catalyst or the base catalyst can be from about 0.01 to about 5 weight percent, or about 0.05 to about 3 weight percent, or from about 0.1 to about 5 weight percent of the poly (alkylene carbonate).

The properties of poly(alkylene carbonate)s such as thermal decomposition temperature, glass transition temperature, modulus and melt flow index can be controlled by various methods. Furthermore, the support materials comprised of poly(alkylene carbonates) may further comprise an inert material, such as silica/sand, titania, alumina, glass, metal, cellulose, synthetic polymers, carbon fibers and the like. The support materials including poly(alkylene carbonates) may have an inert material incorporated within, having sufficient strength to be used as a support material under the processing conditions in 3D printing. The loading of the inert materials may be in the range from about 1 to about 80 weight percent of the support materials, or from about 5 weight percent to about 50 weight percent, or from about 3 weight percent to about 25 weight percent.

The support materials of the present disclosure may be in different forms of shapes or sizes depending on the type of 3D printing processes. For example, they can be used in 3D printing as powder particles, pellets, or filaments. The support materials may be produced using conventional techniques.

FIG. 1 is a schematic depiction of an embodiment of the support material as the core/shell particles 10. The dimensions of the core and shell are not to scale. The core 12 is an inert material such as silica, titania, alumina, glass, metal, cellulose, synthetic polymers, carbon fibers and the like. The core may include an individual particle of the inert materials. Alternatively, the core may include a plurality of particles of the inert material dispersed in a poly(alkylene carbonate) binder. The shell 15 of the core/shell particle 10 comprises a poly(alkylene carbonate) which decomposes at temperature of from about 100° C. to about 300° C. The decomposition temperature of the shell may be tuned by selection of specific polymer or via addition of an organic additive or a catalyst as described early. Specific poly(alkylene carbonates) include poly(ethylene carbonate), poly(propylene carbonate) (PPC), poly(butylene carbonate), poly(cyclohexene carbonate), poly(norbornene carbonate), poly(cyclohexene propylene carbonate) and the like. The poly(alkylene carbonate) has a molecular weight (Mw) ranging from about 10,000 to about 500,000. The core/shell particle 10 of FIG. 1 has a size of from about 3 microns to about 250 microns or in embodiments a size of from about 5 microns to about 200 microns, or from about 20 microns to about 100 microns. The thickness of the shell 15 may be varied as long as it provides sufficient binding strength as a support during the printing process.

The core/shell particles 10 may be made by any known technique or process. For example, the core/shell particles 10 containing individual particle of the inert materials in the core may be made using conventional coating techniques, including wet coating, powder coating and the like. For more complex core/shell particles, they can be made using emulsion/aggregation processes as illustrated in a number of patents for the preparation of toners, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832, 5,405,728, 5,366,841, 5,496,676, 5,527,658, 5,585,215, 5,650,255, 5,650,256 and 5,501,935 (spherical particles), which are totally incorporated herein by reference.

Core/shell particles of the support material disclosed herein may be prepared by aggregation and coalescence processes, in which a mixture comprising core particles of the poly(alkylene carbonate) are aggregated to the appropriate particle size and then coalesced to achieve the final particle shape and morphology. In embodiments, a shell of poly(alkylene carbonate) is added to the aggregated core particles, followed by the coalescence to form a shell of the core/shell particles. The core/shell particle size can be in a range of from about 5 to 120 microns, from 6 to 80 microns, or from 10 to 60 microns.

In certain embodiments, microparticles of the support material disclosed herein may be prepared from a poly (alkylene carbonate) using a hot melt extruder. The process of the disclosure includes contacting the poly(alkylene carbonate) with an oil to form a mixture. The oil aids as a polymer solvent and coacervating agent which causes the polymer to coalesce and form coacervate droplets which eventually harden into microparticles during cooling to ambient temperature. After the microparticles are fully hardened, the oil may be washed away with an oil-miscible solvent. Phase separation occurs between the oil and poly (alkylene carbonate) above a critical volume fraction of the oil, which depends on the polymer concentration, the polymer molecular weight and the temperature. The oil used for the extruding process may include a silicone oil, a non-silicone oil, or the mixture thereof. Specific examples of silicone oil include, but are not limited to, diorganopolysiloxane, organofunctional siloxane, silicone polyether, silicone alkyl wax, phenyl silicone, fluorosilicone, linear siloxanes, cyclic siloxanes, aminofunctional oligosiloxanes, and mixtures thereof. Examples of diorganopolysiloxane include, without limitation, polydimethylsiloxane (PDMS), ethylmethylpolysiloxane, a copolymer of diraethylsiloxane and methylvinylsiloxane, and mixtures of such polymers or copolymers having OH ends. Examples of linear siloxanes include, but are not limited to, hexamethyldisiloxane, octamethyltrisiloxane. Examples of cyclic siloxanes include, but are not limited to octamethyltetracyclosiloxane, decamethylpentacyclosiloxane. In embodiments, the oil comprises diorganopolysiloxane. In embodiments, the oil comprises polydimethylsiloxane. Examples of the non-silicone oil can be an unsaturated oil, such as poppy seed oil, olive oil, peanut oil, sesame oil, cotton seed oil, soybean oil, safflower oil, corn oil, sunflower seed oil and canola oil; or a saturated oil, such as mineral oil, long chain paraffinic oil, and liquid petrolatum.

Specifically the process includes mixing the poly(alkylene carbonate) resin and an oil. The poly(alkylene carbonate) resin may be pre-mixed with an oil and other optional additives, either at room temperature or at an elevated temperature, prior to feeding into the hot melt extruder. The poly(alkylene carbonate) resin and the oil and other optional additives may be added separately into the hot melt extruder. The weight ratio of the poly(alkylene carbonate) resin to oil can be within a particular range of from about 0.5:2.0 to about 1.5:0.5, from about 0.75:1.8 to about 1.25:0.75 , from about 1.0:1.6 to about 1.1:1.0, from about 0.25:1.0 to about 1.0:0.33, from about 0.42:1.0 to about 1.0:0.6, or from about 0.63:1.0 to about 1.0:0.90.

Further the process includes heating the mixture containing the poly(alkylene carbonate) resin and the oil. The mixture of the poly(alkylene carbonate) resin and the oil may be heated at a temperature above the Glass Transition Temperature (Tg) of the poly(alkylene carbonate) resin, prior to mixing or during mixing. In embodiments, the mixture of the poly(alkylene carbonate) resin and oil may be heated at a temperature of from about 30 to about 120° C., from about 30 to about 100° C., or from about 40 to about 80° C.

The mixture of the poly(alkylene carbonate) resin, the oil, and other optional additives may be mixed in the extruder at a speed of from about 50 rotations per minute (rpm) to about 1500 rpm, in embodiments from about 250 rpm to about 1000 rpm, or from about 225 rpm to about 500 rpm. The mixing or contacting may be conducted from about 1 minute to about 60 minutes, from about 5 minute to about 30 minutes, or from about 10 minute to about 20 minutes. This intensive mixing helps achieve molecular level mixing of the poly(alkylene carbonate) resin, the oil, and other optional additives. This type of molecular mixing is able to convert the mixture into a microparticle composite with uniform shape and density. The process includes applying a pressure of about 0 to about 50 meter-grams (mg) to the microparticle composite, in embodiments, forcing the material through an orifice or die, to form microparticles. The unit "meter-gram" refers to the power exerted in raising one gram through the distance of one meter against gravitation. The resulting microparticles are cooled to room temperature (i.e., between 20° C. to 25° C.), washed with an organic solvent such as hexanes, heptane, cyclohexane, or a mixture thereof, to remove the oil. The microparticles after the washing step, can be collected, for example, by filtering through a filter paper or by centrifugation. The particle size of the resulting microparticles may be ranging from about 5 to about 100 microns.

Alternatively, the poly(alkylene carbonate) microparticles may also be prepared by a precipitation process, which starts with preparing a first solution comprising a poly(alkylene carbonate) resin and a polymeric stabilizer by dissolving a poly(alkylene carbonate) resin and a polymeric stabilizer in a water-miscible organic solvent. According to various embodiments of the disclosure, any polymer that is soluble in the solvent or shows affinity to the poly(alkylene carbonate) resin may be effective as a polymeric stabilizer. Non-limiting exemplary polymeric stabilizers may include polystyrene, poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly (vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, Tween™80, Tween™20, hydroxypropyl-methylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer such as Soluplus®, polyvinyl acetate phthalate, and cellulose acetate phthalate. In certain embodiments, the polymeric stabilizer is polyvinyl alcohol, and in certain embodiments, the poly(alkylene carbonate) and polymeric stabilizer may be dissolved at an elevated temperature, such as a temperature ranging from about 30° C. to about 60° C.

The water-miscible organic solvent may be chosen from those known in the art, such as, for example, alcohol, acetic acid, acetone, and acetamides, such as dimethyl acetamide. In certain exemplary embodiments, the water-miscible organic solvent is dimethyl acetamide (DMAc). The ratio of poly(alkylene carbonate) resin to the water-miscible organic solvent may be from about 0.1:1 to about 1:1, such as, for example, about 0.15:1, about 0.16:1, about 0.17:1, or about 0.2:1.

A second solution comprising a water-soluble polymer, such as polyvinyl alcohol, may be prepared in water as an aqueous dispersion. Other water-soluble polymers may include, for example, polyvinyl alcohol, PEG and block copolymers containing PEG, such as, for example, poly(propylene oxide), poly(ethylene butylene), and poly(caprolactone); polyvinyl pyrrolidone, also known as povidone; polyvinyl pyrrolidone-vinyl acetate copolymer; polyacrylic acid; poly(acrylic acid) copolymers modified with block-copolymers of poly(ethylene oxide) and poly(propylene oxide); polyacrylamides; N-(2-Hydroxypropyl) methacrylamide; divinyl ether-maleic anhydride; poly(2-alkyl-2-oxazolines); polyphosphoesters such as polyphosphates and polyphosphonates; water-soluble polyphosphazenes such as poly[di(carboxylatophenoxy)phosphazene] and poly[di(methoxyethoxyethoxy) phosphazene]; natural water soluble polymers such as xanthan gum, pectin, N-carboxymethylchitosan, dextran, carrageenan, guar gum; cellulose ethers such as hydroxypropylmethyl cellulose, hydroxypropyl cellulose, hydroxyethyl cellulose and sodium carboxy methyl cellulose; hyaluronic acid; albumin; starch and starch-based derivatives; water-soluble polymers of N-vinylcarboxamides; and hydrophilic, anionic, and cationic surfactants. In certain embodiments, the water-soluble polymer is polyvinyl alcohol.

Then the second solution may be metered into the first solution and mixed to create a third solution, which results in the precipitation of the poly(alkylene carbonate) microparticles out of the third solution. The poly(alkylene carbonate) microparticles may then be filtered and dried. In certain embodiments, the poly(alkylene carbonate) microparticles prepared according to the methods disclosed herein are cooled, such as slow cooled by reaching ambient temperature on their own, or quench cooled, for example with ice. The particle size of the resulting microparticles may be ranging from about 5 to about 100 microns.

Figure 2:
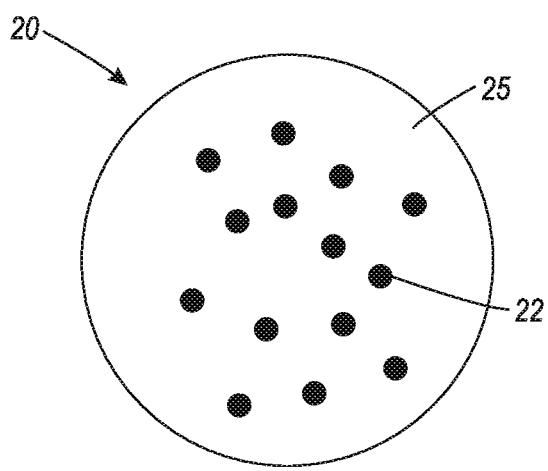
FIG. 2 is a schematic illustration of a particle according to various embodiments disclosed herein.

In embodiments the support material may include a particle that has the inert material dispersed throughout the poly(alkylene carbonate). FIG. 2 is a schematic depiction of an embodiment of the support material as particle(s) 20 having inert material 22 dispersed within the poly(alkylene carbonate) 25. The inert material 22 includes silica/sand, titania, alumina, glass, metal, cellulose, synthetic polymers and carbon fibers. The poly(alkylene carbonate) 25 decomposes at temperature of from about 100° C. to about 300° C. The particle 20 of FIG. 2 has a size of from about 3 microns to about 500 microns, or in embodiments a size of from about 5 microns to about 250 microns, or from about 20 microns to about 100 microns. The particle 20 may be manufactured by the techniques discussed above for core/shell particles or the poly(alkylene carbonate) microparticles. In addition, the particle 20 may also be manufactured by other conventional mechanical grinding processes, including for example, blending of the inert materials with a poly(alkylene carbonate) by extrusion, grinding the blends into particles, sieving the particles and the like.

Figure 3:
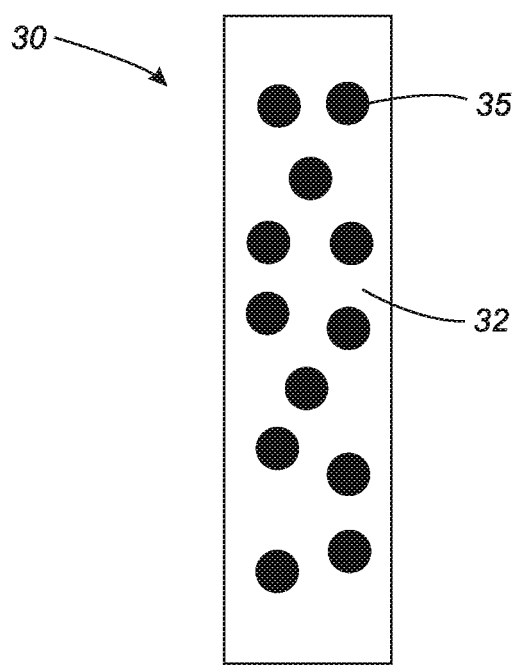
FIG. 3 is a schematic illustration of a filament according to various embodiments disclosed herein.

In embodiments the support material may be a filament of poly(alkylene carbonate) wherein the inert material dispersed throughout the poly(alkylene carbonate). FIG. 3 is a schematic of an embodiment of the support material as a filament 30 having the inert material 32 dispersed within the poly(alkylene carbonate) 35. The inert material includes silica/sand, titania, alumina, glass, metal, cellulose, synthetic polymers and carbon fibers. The poly(alkylene carbonate) 35 decomposes at a temperature of from about 100° C. to about 300° C. Filament 30 of FIG. 3 has a length and diameter suitable for use as a support material. Current standards for the 3D printing industry may provide filaments having a diameter of from about 0.5 millimeter to about 15 millimeters, or from about 0.75 millimeters to about 4.5 millimeters, or from about 1 millimeter to about 3.5 millimeters, depending on printer settings such as the printing nozzle size, printing speed, and or printing resolution. Filament 30 may be manufactured by the mixing the inert material 32 and the poly(alkylene carbonate) and a temperature above the glass transition temperature of the poly(alkylene carbonate) and then extruding the mixture to form filaments.

FIGS. 4(A) and 4(B) schematically demonstrate a process using sacrificial polycarbonate materials and inert fillers to form supports in 3D printing. In FIG. 4(A), a 3D object 43 is formed through one of the various 3D printing techniques using powder particles or filaments, disclosed herein. The 3D object 43 is formed using a build material with one of the various 3D printing techniques described. The 3D object 43 is supported by supports 42 formed from poly(alkylene carbonate) 45 and an inert material 44. The supports 42 are formed along with the 3D object 43, e. g., through a 3D printing method. The supports 42 support the 3D object 43 during the 3D printing method. The supports 42 can be formed from particles or filaments as disclosed herein. The supports 42 may contain inert materials 44 as disclosed herein along with the poly(alkylene carbonate) 45. Heat is applied to the 3D object 43 that raises the temperature of the 3D object 43 and supports 42 above the decomposition temperature of the poly(alkylene carbonate) 45. The supports 42 collapse as the poly(alkylene carbonate) decomposes into $CO_2$ and volatile molecules, and the inert material 44 falls away. This is shown in FIG. 4(B). The inert material 44 incorporated into supports 42 are composed of mainly the inexpensive, inorganic core, surrounded by a thin layer of poly(alkyklene carbonate) for binding.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Preparation of Poly(Propylene Carbonate) Microparticles by Hot Melt Extrusion

A small-scale Haake double screw extruder was used for the preparation of the microparticles. For a 1:1 formulation of poly(propylene carbonate) (QPAC®40) to polydimethylsiloxane oil (PDMS, Clearco, 18-22K cSt), the amount of poly(propylene carbonate) was 30 grams and the amount of PDMS oil was also 30 grams. The poly(propylene carbonate) and PDMS oil were premixed and fed through the Haake extruder. The extruder was set to 50° C. so that the poly(propylene carbonate) or QPAC® 40 would thoroughly melt throughout oil. The rpm of extruder was set to 200 and mixed the resin/oil together for 15 minutes under 20 megagrams of torque. After extrusion, the poly(propylene carbonate) microparticles were discharged onto an aluminum pan and cooled to room temperature. The poly(propylene carbonate)/oil slurry was placed in a beaker with about 200 ml of heptane and mixed with an overhead stirrer for about 20 minutes. The unwanted PDMS/heptane mixture was removed by vacuum filtration using Whatman #1 90 mm filter paper to collect the poly(propylene carbonate) microparticles. This washing procedure was repeated one more time. After the final filtration, the "clean" microparticles (i.e., product) were then air dried overnight in an aluminum pan in the fumehood to allow any residual ethyl acetate to evaporate. The particle size may was in a range from about 35 µm to about 75 µm.

Example 2

Preparation of Poly(Propylene Carbonate) Microparticles by Precipitation from Water-Miscible Solvent/Water Precipitation Microparticles were prepared by mixing 50 g poly(propylene carbonate) (QPAC® 40) and 19.5 g polyvinyl alcohol in 300 g dimethylacetamide to create a first solution. A separate solution of (2.2 wt %) of polyvinyl alcohol in deionized water was also prepared. Next, the polyvinyl alcohol aqueous solution was metered into the first solution by a peristaltic pump, such that the polyvinyl alcohol aqueous solution acted as the solvent that caused the precipitation of the poly(propylene carbonate) microparticles out of the final solution. The microparticles were left to reach ambient temperature on their own. The particle size was in a range of from about 30 µm to about 45 µm.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims

What is claimed is:

1. A support material for 3D printing, the support material comprising:
   poly(alkylene carbonate) core/shell particles having a size of from 3 to 250 microns;
   wherein the core comprises an inert material of from 5 weight percent to about 50 weight percent of the support material; and
   wherein the poly(alkylene carbonate), has a decomposition temperature of from 100° C. to about 300° C.

2. The support material according to claim 1, wherein the poly(alkylene carbonate) is selected from the group consisting of: poly(propylene carbonate), poly(ethylene carbonate), poly(butylene carbonate) and poly(cyclohexene carbonate), poly(norbornene carbonate), and poly(cyclohexene propylene carbonate).

3. The support according to claim 1, wherein the poly(alkylene carbonate) has a molecular weight (Mw) ranging from about 10,000 to about 500,000.

4. The support material according to claim 1, wherein the inert material is selected from the group consisting of: silica, titania, alumina, carbon, glass, metal, cellulose, and a synthetic polymer.

5. The support material according to claim 1, further comprising an additive selected from a group consisting of: a cyclodextrin, an organic acid, a photo acid generator, a photo base generator, a thermal acid generator, and a thermal base generator.

6. The support material according to claim 5, wherein the concentration of the additive is about 0.1 to about 5 weight percent based on the weight of the poly(alkylene carbonate).

7. The support material according to claim 5, wherein the organic acid comprises a carboxylic acid containing from about 5 to about 30 carbon atoms.

8. The support material according to claim 5, wherein the photo acid generator or the thermal acid generator comprises a diphenyliodonium salt, a benzyl sulfonate ester, an imino sulfonate ester, and a spiropyran-based sulfonic acid.

9. The support material according to claim 5, wherein the photo base generator comprises 2-(9-oxoxanthen-2-yl)propionic Acid 1,5,7-Triazabicyclo[4.4.0]dec-5-ene salt or 1,5,7 e triaza-bicyclo [4.4.0]dec-5-ene tetraphenylborate.

* * * * *